Patented Aug. 9, 1927.

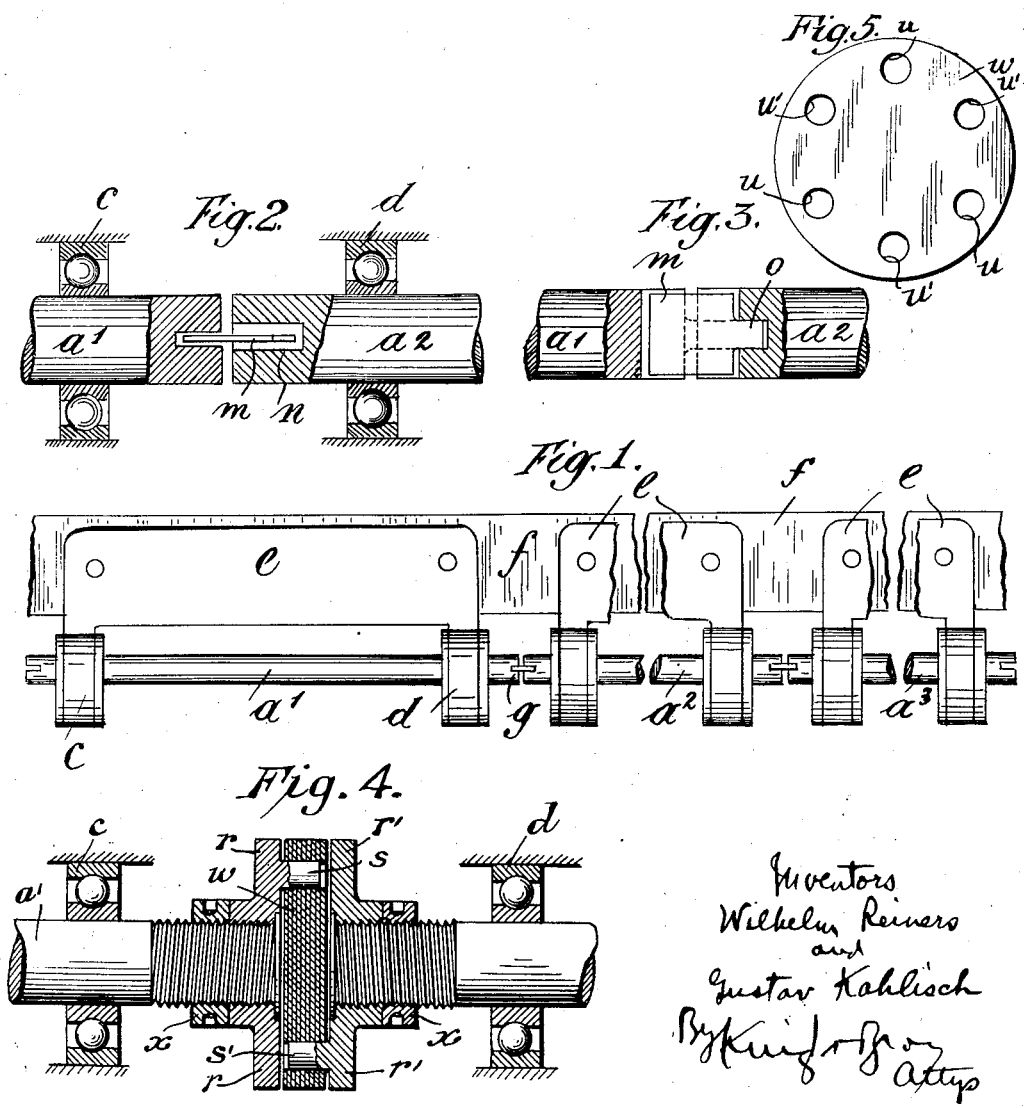

1,638,060

UNITED STATES PATENT OFFICE.

WILHELM REINERS AND GUSTAV KAHLISCH, OF MUNICH-GLADBACH, GERMANY, ASSIGNORS TO W. SCHLAFHORST & CO., OF MUNICH-GLADBACH, GERMANY, A CORPORATION OF GERMANY.

BOBBIN-DRIVING SHAFT FOR WINDING FRAMES AND ITS BEARING ARRANGEMENT.

Application filed March 1, 1926, Serial No. 91,595, and in Germany March 2, 1925.

Hitherto the bobbin driving shafts of winding frames for driving the cross wound bobbins in cheese winding frames by friction are rigidly interconnected as regards the part sections belonging to one driving head, so as to form one single shaft which is carried in sliding friction bearings, ball bearings or roller bearings placed at the customary distances. This method has shown the following drawbacks:

In view of the comparatively great length of winding frames and the great number of shaft bearings resulting therefrom, exact alignment of the winding shafts on the usually very uneven mill flooring can only be obtained in the rarest cases, and therefore there will be inside each shaft length considerable jamming of bearings which renders impossible true running and therefore the application of high speeds of rotation and high yarn speeds. This drawback is doubly felt when sliding bearings are replaced by ball or roller bearings which require a particularly exact axial adjustment so as to avoid all jamming. Where winding shafts are carried in several bearings, this drawback cannot even be avoided by the application of self-aligning ball bearings, as these can obviously adjust themselves in one direction only, so that their self-aligning property is useless for their application as intermediate bearings of a shaft carried in several bearings.

Rigid shafts carried in several bearings, particularly if these are ball or roller bearings, have the further drawback that for purposes of reparation or replacement of a damaged bearing, the whole shaft with all its bearings must be taken out, a proceeding connected with great waste of time and a deal of trouble.

The aim of the present invention is the elimination of these drawbacks and thereby to render possible the adoption of higher rotating and winding speeds than was hitherto possible.

Fig. 1 is an elevational view of a bobbin driving shaft according to the present invention.

Fig. 2 is a detail view of one of the couplings shown in Fig. 1, parts being shown in section.

Fig. 3 is a view similar to that of Fig. 2 but taken at right angles thereto.

Fig. 4 is a side view with parts shown in section of a modified form of coupling; and Fig. 5 is a detail view of a coupling plate used in connection with the coupling shown in Fig. 4.

Fig. 1 shows three sections of a winding shaft made independently supported in several lengths, each shaft piece $a^1$, $a^2$, $a^3$ etc., being separately carried in bearings $c$, $d$ at each end of the section, the transmission of the motion from one section to another being effected by a clutch coupling with breakage safety device.

In the present example of application ball bearings are provided, but roller bearings, sliding friction bearings or other types may be employed. The two bearings $c$ and $d$ of each shaft section $a^1$, $a^2$ etc. are interconnected by a cradle $e$ which in its turn is fixed on a rail $f$ common to all the cradles. By the separate dispostion of each section shaft in bearings, the latter is in itself protected against deflection, and therefore the bearings are even better protected against jamming. Moreover, the exact relative adjustment of two bearings of a shaft section will be ensured by the employment of suitable ball bearings. In addition, a specially arranged coupling to be described further on will permit of lifting out a shaft section with its bearings by the cradle connecting the two bearings, thus allowing the removal of one particular section shaft for the purpose of reparation or replacement of a damaged bearing or part of the coupling without necessitating the loosening of bearings of other sections.

The coupling $g$ of two section shafts for the purpose of the transmission of motion can be effected in different ways.

For example, a coupling such as that shown in Figs. 2 and 3 may be used. According to this form of coupling the opposing ends of adjacent shaft sections are slotted and a tongue $m$ inserted in one slot projects into the other and thereby connects the two sections of shaft. The shaft end into which the tongue is inserted has an axial bore $n$ and, as shown in Fig. 3, the tongue itself is provided with a projection

*o* fitting into the bore *n* but in such a way that it can slide diametrically out of the slots in which it loosely lies. If such a tongue is sheared-off or if a shaft section is removed for other reasons, the particular shaft section is lifted out of the slots parallel to the axis of the shaft, and if a tongue is sheared-off, it is replaced. It will be noticed that in this case one end of each section shaft carriers a tongue whilst the other end is provided with a slot taking the tongue of the next shaft section.

By making at least one of the slots according to Figs. 6 to 8, or by making the slot *k* of Fig. 5 wider than the thickness of the coupling tongue or coupling pegs, the section shafts can be interconnected without jamming in the bearings, even if their various axes are not absolutely in one straight line, within certain limits.

In the working example represented in Fig. 4, the adjoining shaft ends are each provided with a coupling plate $r$—$r^1$, which are screwed on their shaft ends. The coupling surfaces facing each other each carry two or more driving pegs $s$—$s^1$ which are placed in alternate positions. The coupling plate as per Fig. 5 is made of leather or india rubber or other suitable material, in one or more pieces; it is provided with holes $u$ and $u^1$ respectively, and it is introduced between the two coupling halves, the holes $u$ taking the pegs $s$, the holes $u^1$ the pegs $s^1$. The intermediate plate as per Fig. 5 thus serves to elastically transmit the motion from the driving parts to the driven parts.

Also in this case the shaft sections can to a certain extent form an angle without interfering with the driving.

The coupling halves are fixed on screw threads of large diameter, allowing them to be screwed apart, after loosening the locknuts $x$.

The disc $w$ can be taken out when the two coupling plates have been screwed apart and the shaft sections independently removed as in the modification shown in Figs. 2 and 3.

What we claim is:

1. A bobbin driving shaft for winding frames comprising a plurality of shaft sections interconnected by flexible couplings.

2. A bobbin driving shaft in accordance with claim 1 in which each shaft section is individually carried in bearings at both ends.

3. A bobbin driving shaft in accordance with claim 1 in which each shaft section is mounted in bearings arranged on a detachable connecting frame common to all the bearings of the shaft.

4. A bobbin driving shaft in accordance with claim 1 in which the coupling members are so constructed that one shaft section can be taken diametrically out of from between the adjacent shaft sections without loosening the bearings of said adjacent sections.

In testimony whereof the foregoing specification is signed.

WILHELM REINERS.
GUSTAV KAHLISCH.